(12) United States Patent
Zhao et al.

(10) Patent No.: US 7,894,213 B2
(45) Date of Patent: Feb. 22, 2011

(54) DC TO DC CONVERTER

(75) Inventors: Li-Jun Zhao, Shenzhen (CN); Tong Zhou, Shenzhen (CN); Jia-Hui Tu, Shenzhen (CN)

(73) Assignees: Innocom Technology (Shenzhen) Co., Ltd., Shenzhen, Guangdong Province (CN); Chimei Innolux Corporation, Miao-Ki County (TW)

( * ) Notice: Subject to any disclaimer, the term of this patent is extended or adjusted under 35 U.S.C. 154(b) by 263 days.

(21) Appl. No.: 12/317,864

(22) Filed: Dec. 29, 2008

(65) Prior Publication Data

US 2009/0168463 A1 Jul. 2, 2009

(30) Foreign Application Priority Data

Dec. 29, 2007 (CN) .......................... 20071 0125662

(51) Int. Cl.
*H02M 3/335* (2006.01)

(52) U.S. Cl. ...................................... 363/19; 363/21.08

(58) Field of Classification Search .................. 363/18, 363/19, 21.08, 21.16, 97, 131
See application file for complete search history.

(56) References Cited

U.S. PATENT DOCUMENTS 5,138,543 A  8/1992  Harm et al.
5,745,358 A *  4/1998  Faulk ........................... 363/95
7,012,816 B2 *  3/2006  Amei ........................... 363/19
7,123,488 B2 * 10/2006  Hirabayashi et al. .......... 363/19
7,433,208 B2 * 10/2008  Nishida et al. ................. 363/19
2008/0007976 A1  1/2008  Mizuno

FOREIGN PATENT DOCUMENTS

CN       2472406 Y    1/2002
CN     101090238 A   12/2007

* cited by examiner

*Primary Examiner*—Gary L Laxton
(74) *Attorney, Agent, or Firm*—Wei Te Chung

(57) ABSTRACT

An exemplary DC to DC converter includes a first transistor, a second transistor, a transformer, and a pulse generating circuit having a first capacitor, a sampling resistor, a zener diode, and a first diode. A DC voltage input terminal is configured for receiving a first DC voltage and is grounded via the primary winding of the transformer, a collector electrode and an emitter electrode of the first transistor in series. A terminal of the auxiliary winding of the transformer is grounded via the inverted first diode, the non-inverted zener diode, the sampling resistor, and the first capacitor. The other terminal of the auxiliary winding is grounded. A first transistor having a base electrode connected to the DC voltage input terminal. A second transistor includes an emitter electrode a cathode of the zener diode, a collector electrode connected to a base electrode of the first transistor, and a grounded base electrode.

15 Claims, 2 Drawing Sheets

DC TO DC CONVERTER

FIELD OF THE DISCLOSURE

The present disclosure relates to power conversion, and more particularly to direct current to direct current (DC to DC) converters.

GENERAL BACKGROUND

DC to DC converters are frequently employed in electronic equipment to convert relatively low voltage DC sources into high voltage DC sources. The high voltage DC sources are then suitable for application to a DC load, such as electrodes of an electron tube or other electrical devices.

Referring to FIG. 2, one such DC to DC converter 1 includes a first rectifying and filtering circuit 11, a protecting circuit 13, a transformer 15, a second rectifying and filtering circuit 16, a pulse width modulation (PWM) circuit 17, a rectifying diode 18, a transistor 19, and a voltage output 163. The transistor 19 is a p-channel metal-oxide-semiconductor field-effect transistor (P-MOSFET).

The PWM circuit 17 includes a voltage input 171 configured to receive an operation voltage, and a pulse output 172 configured to provide a pulse signal to a gate electrode of the transistor 19.

The first rectifying and filtering circuit 11 includes two inputs 111, 112 configured to receive an external alternating current (AC) voltage such as a 220 volt (220V) AC voltage, a full-bridge rectifying circuit 110 configured to convert the 220V AC voltage to a first direct current (DC) voltage, a filter capacitor 114 configured to stabilize the first DC voltage, and a first output 113 configured to provide the first DC voltage to the transformer 15. Two inputs of the full-bridge rectifying circuit 110 serve as the two inputs 111, 112. A positive output of the full-bridge rectifying circuit 110 serves as the first output 113. A negative output of the full-bridge rectifying circuit 110 is grounded. The filter capacitor 114 is connected between the first output 113 and ground.

The transformer 15 includes a primary winding 151, an auxiliary winding 152, and a secondary winding 153. The first output 113 of the first rectifying and filtering circuit 11 is connected to ground via the primary winding 151, a drain electrode and a source electrode of the transistor 19, and a resistor 190 in series. The gate electrode of the transistor 19 is connected to the pulse output 172 of the PWM circuit 17. The protecting circuit 13 is connected in parallel with the primary winding 151.

One terminal of the auxiliary winding 152 is connected to ground. The other terminal of the auxiliary winding 152 is connected to the voltage input 171 of the PWM circuit 17 via the diode 18 in a forward direction.

The second rectifying and filtering circuit 16 includes a second rectifying circuit 161 and a second filter capacitor 162. The secondary winding 153 is coupled to the voltage output 163 via the second rectifying and filtering circuit 16 for providing a second DC voltage to a load circuit (not shown) through the voltage output 163.

The external AC voltage is provided to the two inputs 111, 112 of the first rectifying and filtering circuit 11, and is transformed into the first DC voltage by the first rectifying and filtering circuit 11. Then the first DC voltage is provided to the primary winding 151. The auxiliary winding 152 induces the primary winding 151, generates an operation voltage, and provides the operation voltage to the voltage input 171 of the PWM circuit 17 via the rectifying diode 18. Thus the PWM circuit 17 generates the pulse signal for switching on or switching off the transistor 19. When the transistor 19 is switched on, a first current path is formed sequentially through the first output 113, the primary winding 151, the transistor 19, and the resistor 190. A first current is formed when the first DC voltage provided to the first output 113 is connected to ground via the first current path. The first current flowing through the first current path linearly increases until electromagnetic induction generated in the primary winding 151 reaches a predetermined maximum threshold.

When the transistor 19 is switched off, the energy stored in the primary winding 151 of the transformer 150 transfers to the secondary winding 153. Thus an AC voltage across the secondary winding 153 is generated. The second rectifying and filtering circuit 16 transforms the AC voltage into the second DC voltage, and provides the second DC voltage to the load circuit.

Because the DC to DC converter 1 includes a lot of electric units, a volume of the DC to DC converter 1 is correspondingly large. Furthermore, the PWM circuit 17 is typically in the form of a PWM IC, and a cost of the PWM IC is high. This in turn makes the DC to DC converter 1 expensive.

It is desired to provide a new DC to DC converter which can overcome the described limitations.

SUMMARY

An exemplary DC to DC converter includes a DC voltage input terminal, a first transistor, a second transistor, a transformer, a pulse generating circuit. The DC voltage input terminal is configured for receiving a first DC voltage. The transformer includes a primary winding, an auxiliary winding, and a secondary winding. The pulse generating circuit includes a first capacitor, a sampling resistor, a zener diode, and a first diode. The DC voltage input terminal is capable of being grounded via the primary winding, a collector electrode and an emitter electrode of the first transistor in series. A terminal of the auxiliary winding is capable of being grounded via the inverted first diode, the non-inverted zener diode, the sampling resistor, and the first capacitor. The other terminal of the auxiliary winding is capable of being grounded. The second transistor includes an emitter electrode connected to a cathode of the zener diode, a collector electrode connected to a base electrode of the first transistor, a base electrode capable of being connected to ground. The base electrode of the first transistor is connected to the DC voltage input terminal.

Other novel features and advantages will become more apparent from the following detailed description when taken in conjunction with the accompanying drawings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Reference will now be made to the drawings to describe various embodiments in detail.

Figure 1:
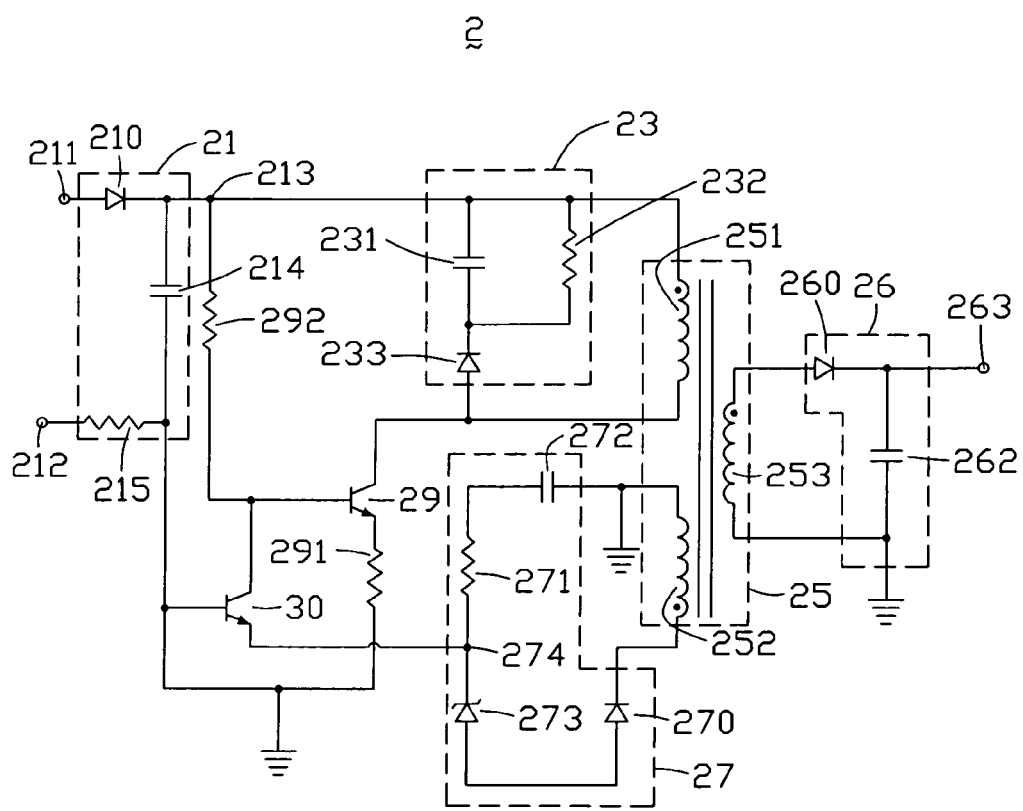
FIG. 1 is a diagram of of a DC to DC converter according to an exemplary embodiment of the present invention.
Figure 2:
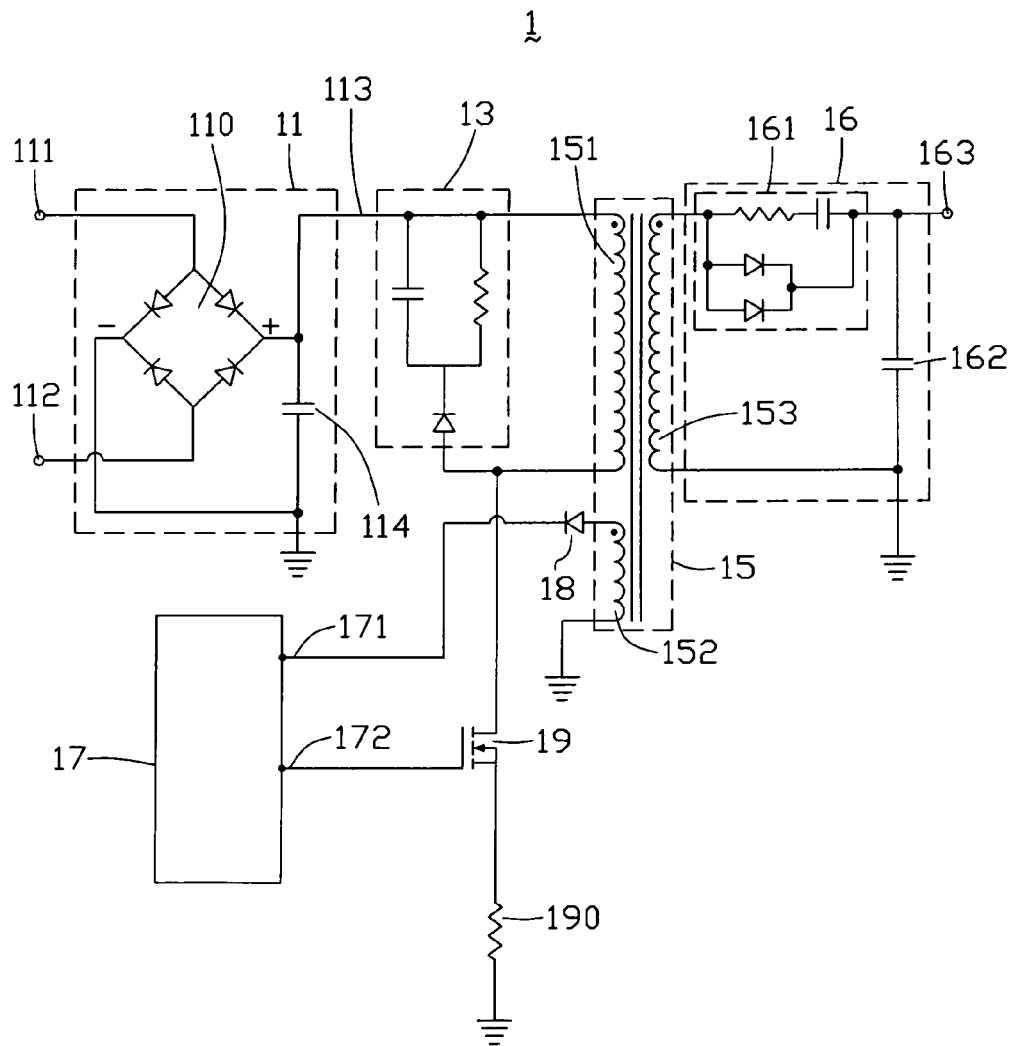
FIG. 2 is a diagram of a related art DC to DC converter.

Referring to FIG. 1, an exemplary DC to DC converter 2 includes a first rectifying and filtering circuit 21, a protecting circuit 23, a transformer 25, a second rectifying and filtering circuit 26, a pulse generating circuit 27, a first transistor 29, a second transistor 30, and a voltage output 263.

The first rectifying and filtering circuit 21 includes an output terminal 213, a first rectifying diode 210, a first filtering capacitor 214, and a limiting resistor 215. The first filtering capacitor 214 is connected between the output terminal 213 and ground. The output terminal 213 is connected to one terminal 211 of an external AC voltage such as a 220V or 110V AC voltage. The other terminal 212 of the external AC voltage is grounded via the limiting resistor 215.

The transformer 25 includes a primary winding 251, an auxiliary winding 252, and a secondary winding 253. The output terminal 213 of the first rectifying and filtering circuit 21 is connected to ground via the primary winding 251, a collector electrode and an emitter electrode of the first transistor 29, and a first resistor 291 in series. A base electrode of the first transistor 29 is connected to the output terminal 213 via a bias resistor 292. The protecting circuit 23 is connected in parallel with the primary winding 251.

The pulse generating circuit 27 includes a first diode 270, a sampling resistor 271, a first capacitor 272, a zener diode 273, and a control terminal 274. One terminal of the auxiliary winding 252 is grounded via the inverted first diode 270, the non-inverted zener diode 273, the sampling resistor 271, and the first capacitor 272. The other terminal of the auxiliary winding 252 is directly grounded. A cathode of the zener diode 273 is defined as the control terminal 274.

An emitter electrode of the second transistor 30 is connected to the control terminal 274 of the pulse generating circuit 27. A base electrode of the second transistor 30 is grounded. A collector electrode of the second transistor 30 is connected to the base electrode of the first transistor 29.

The second rectifying and filtering circuit 26 includes a second rectifying diode 260 and a second filtering capacitor 262. A terminal of the secondary winding 253 is connected to the voltage output 263 via the non-inverted second rectifying diode 260. The other terminal of the secondary winding 253 is grounded. The second filtering capacitor 262 is connected between the voltage output 263 and ground.

The protecting circuit 23 includes a second capacitor 231, a second resistor 232, a second diode 233. The second capacitor 231 and the inverted second diode 233 are connected in series between the output terminal 213 and the collector electrode of the first transistor 29. The second resistor 232 is connected in parallel with the second capacitor 231. The protecting circuit 23 is configured to absorb an induced high voltage across the primary winding 251.

The 220V or 110V external AC voltage is rectified and filtered by the first rectifying and filtering circuit 21, and is transformed into a first DC voltage. Then the first DC voltage is provided to the base electrode of the first transistor 29 to switch on the first transistor 29. When the transistor 29 is switched on, a first current path is formed sequentially through the output terminal 213, the primary winding 251, the transistor 29, and the resistor 291. A first current is formed when the first DC voltage provided to the first output 213 is connected to ground via the first current path. A resistance of the bias resistor 292 is typically about 510 kilo-ohms (kΩ) for restricting a current flowing through the base electrode of the first transistor 29.

At the same time, a first induced voltage across the auxiliary winding 252 is generated. Because the first diode 270 is connected in series with the auxiliary winding 252 in a fly back mode, the first induced voltage across the auxiliary winding 252 backward biases the first diode 270 and causes the first diode 270 to remain in an off state. Thus electromagnetic induction energy is gradually stored in the auxiliary winding 252, and the first induced voltage across the auxiliary winding 252 gradually increases until it reaches a predetermined maximum value. After that, the electromagnetic induction energy stored in the auxiliary winding 252 is discharged to charge the first capacitor 272 via the sampling resistor 271, and the first induced voltage across the auxiliary winding 252 gradually decreases. When a voltage of the control terminal 274 (i.e., a voltage across the sampling resistor 271) decreases to a conducting voltage of the second transistor 30, the second transistor 30 is switched on. Because a terminal of the first capacitor 272 is grounded, the voltage at the other terminal of the first capacitor 272 is a negative voltage. Thus the base electrode of the first transistor 29 is connected to the control terminal 274 via the activated second transistor 30 to obtain a negative voltage which switches off the first transistor 29.

When a charging voltage across the first capacitor 272 reaches a predetermined maximum value, in other words, the first capacitor 272 is completely charged, the first capacitor 272 starts to discharge and the first induced voltage across the auxiliary winding 252 gradually increases again. When the voltage of the control terminal 274 increases to a non-conducting voltage of the second transistor 30, the second transistor 30 is switched off. Thus the first transistor 29 is switched on, and the first current is formed and flows through the primary winding 251 again. The electromagnetic induction energy is gradually stored in the auxiliary winding 252, and the first induced voltage across the auxiliary winding 252 gradually increases until it reaches the predetermined maximum value. After that, the operation of the DC to DC converter 2 is repeated.

As described above, since a negative pulse signal can be generated by the pulse generating circuit 27 and outputted from the control terminal 274 for controlling the second transistor 30, thereby controlling the first transistor 29, the first transistor 29 is repeatedly switched on and switched off according to the frequency of the negative pulse signal. Thus a pulse current is generated and flows through the primary winding 251 according to the same frequency of the negative pulse signal. The secondary winding 253 induces the primary winding 251 to generate an AC voltage across the secondary winding 253. The second rectifying and filtering circuit 26 transforms the AC voltage across the secondary winding 253 into the second DC voltage, and provides the second DC voltage to a load circuit. The zener diode 273 is configured to restrict an amplitude of the negative pulse signal in a predetermined range, such that the DC to DC converter 2 can work stably.

Because the DC to DC converter 2 includes the pulse generating circuit 27 configured to generate the negative pulse for switching on and switching off the first and second transistors 29, 30, the DC to DC converter 2 is simple. Furthermore, unlike with a conventional PWM IC, the DC to DC converter 2 does not need a PWM IC. Therefore the cost of the DC to DC converter 2 can be correspondingly reduced.

In an alternative embodiment, the first and second transistors 29, 30 can be negative-positive-negative (NPN) bipolar transistors or positive-negative-positive (PNP) bipolar transistors. In another alternative embodiment, the current limiting resistor 291 and the protecting circuit 23 can be omitted. In a further alternative embodiment, the first rectifying and filtering circuit 21 can be omitted. In such case, the output terminal 213 is directly electrically connected to a DC voltage.

It is to be further understood that even though numerous characteristics and advantages of the present embodiments have been set out in the foregoing description, together with details of the structures and functions of embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A direct current (DC) to DC converter comprising:
   a DC voltage input terminal for receiving a first DC voltage,
   a first transistor comprising a base electrode connected to the DC voltage input terminal,
   a transformer comprising a primary winding, an auxiliary winding, and a secondary winding, the DC voltage input terminal capable of being grounded via the primary winding, a collector electrode and an emitter electrode of the first transistor in series,
   a pulse generating circuit comprising a first capacitor, a sampling resistor, a zener diode, and a first diode, a terminal of the auxiliary winding capable of being grounded via the inverted first diode, the non-inverted zener diode, the sampling resistor, and the first capacitor, and the other terminal of the auxiliary winding capable of being grounded, and
   a second transistor comprising an emitter electrode connected to a cathode of the zener diode, a collector electrode connected to a base electrode of the first transistor, and a base electrode capable of being connected to ground.

2. The DC to DC converter of claim 1, further comprising a first rectifying and filtering circuit configured to transform an external alternating current (AC) voltage to the first DC voltage and provide the first DC voltage to the DC voltage input terminal.

3. The DC to DC converter of claim 2, wherein the first rectifying and filtering circuit comprises an output terminal, a first rectifying diode, a first filtering capacitor, and a limiting resistor, wherein the first filtering capacitor is capable of being connected between the output terminal and ground, the voltage output is connected to one terminal of the external AC voltage, and the other terminal of the external AC voltage is capable of being grounded via the limiting resistor.

4. The DC to DC converter of claim 3, wherein the external AC voltage is a 220 volt (220V) or 110V AC voltage.

5. The DC to DC converter of claim 1, further comprising a first resistor capable of being connected between the emitter electrode of the first transistor and ground.

6. The DC to DC converter of claim 1, further comprising a bias resistor connected between the DC voltage input terminal and the base electrode of the first transistor.

7. The DC to DC converter of claim 6, wherein a resistance of the bias resistor is approximately 510 kilo-ohms.

8. The DC to DC converter of claim 1, further comprising a protecting circuit connected between the DC voltage input terminal and the collector electrode of the first transistor.

9. The DC to DC converter of claim 8, wherein the protecting circuit comprises a second capacitor, a second resistor, and a second diode, wherein the second capacitor and the inverted second diode are connected in series between the output terminal and the collector electrode of the first transistor, and the second resistor is connected in parallel with the second capacitor.

10. The DC to DC converter of claim 1, further comprising a second rectifying and filtering circuit configured to transform an AC voltage across the secondary winding to a second DC voltage.

11. The DC to DC converter of claim 10, wherein the second rectifying and filtering circuit comprises a second rectifying diode and a second filtering capacitor, wherein a terminal of the secondary winding is connected to a voltage output via the non-inverted second rectifying diode, the other terminal of the secondary winding is capable of being grounded, and the second filtering capacitor is capable of being connected between the voltage output and ground.

12. The DC to DC converter of claim 1, wherein the pulse generating circuit is configured to generate a negative pulse signal and provide the negative pulse signal to an emitter electrode of the second transistor when the first DC voltage is provided to the DC voltage input terminal.

13. The DC to DC converter of claim 12, wherein the zener diode is configured to restrict an amplitude of the negative pulse signal within a predetermined range.

14. A DC to DC converter comprising:
   a transformer comprising a primary winding, an auxiliary winding, and a secondary winding,
   a DC voltage input terminal for receiving a first DC voltage, the DC voltage input terminal capable of being grounded via the primary winding and a first transistor in series, the first transistor comprising a control terminal connected to the DC voltage input terminal,
   a pulse generating circuit connected to the auxiliary winding, the pulse generating circuit being configured to generate a negative pulse signal, and
   a second transistor comprising a first conducting electrode for receiving the negative pulse signal, a second conducting electrode connected to the control terminal of the first transistor, and a grounded control terminal, the second transistor being configured for switching on and switching off the first transistor according to negative pulse signal.

15. The DC to DC converter of claim 14, wherein the pulse generating circuit comprising a first capacitor, a sampling resistor, a zener diode, and a first diode, a terminal of the auxiliary winding capable of being grounded via the inverted first diode, the non-inverted zener diode, the sampling resistor, and the first capacitor, and the other terminal of the auxiliary winding capable of being grounded.

* * * * *